No. 698,230. Patented Apr. 22, 1902.
G. H. SPAULDING, Dec'd.
L. L. SPAULDING, Administratrix.
GRAIN SHOCKING ATTACHMENT FOR HARVESTING MACHINES.
(Application filed Feb. 27, 1901.)
(No Model.) 8 Sheets—Sheet 1.
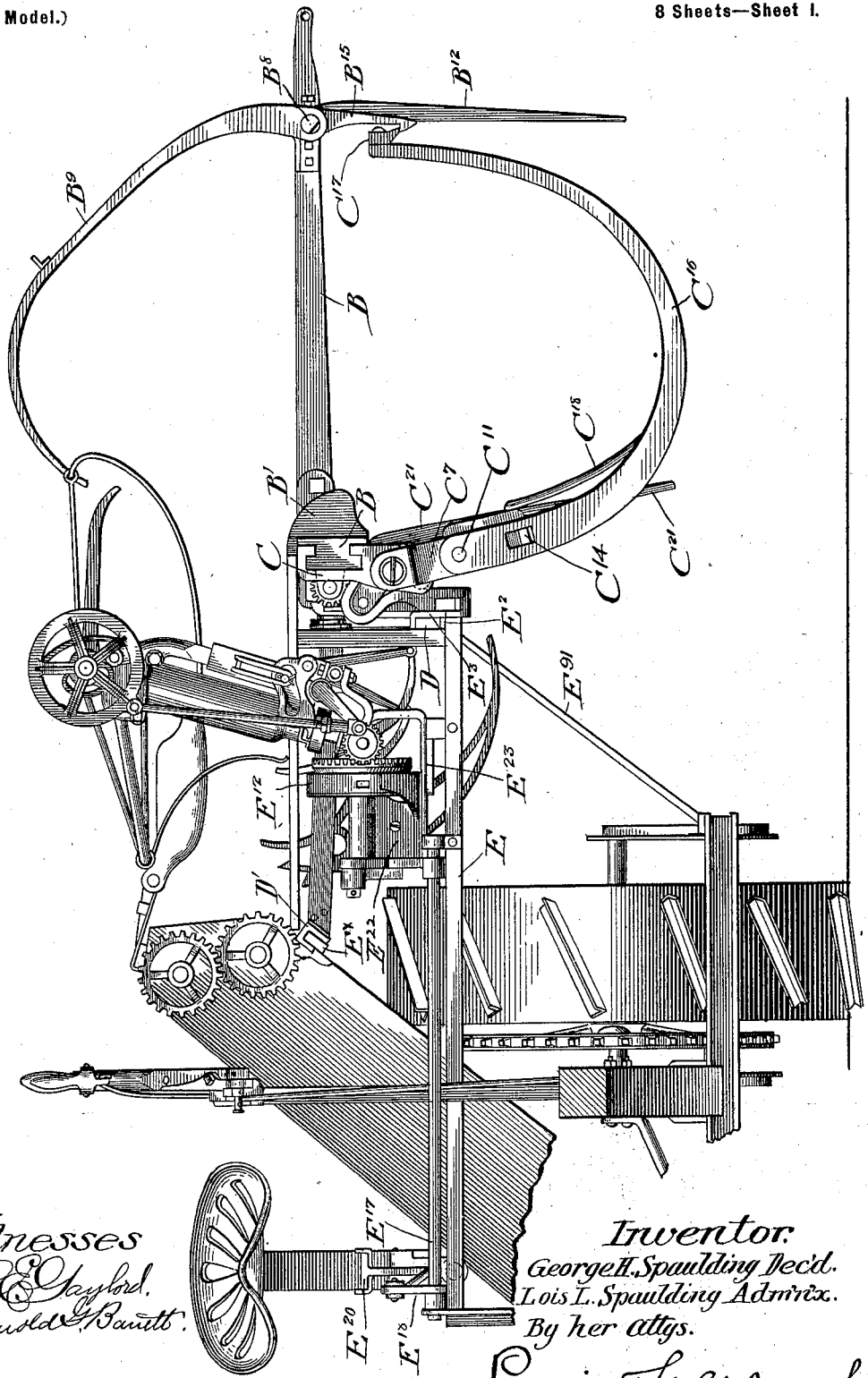

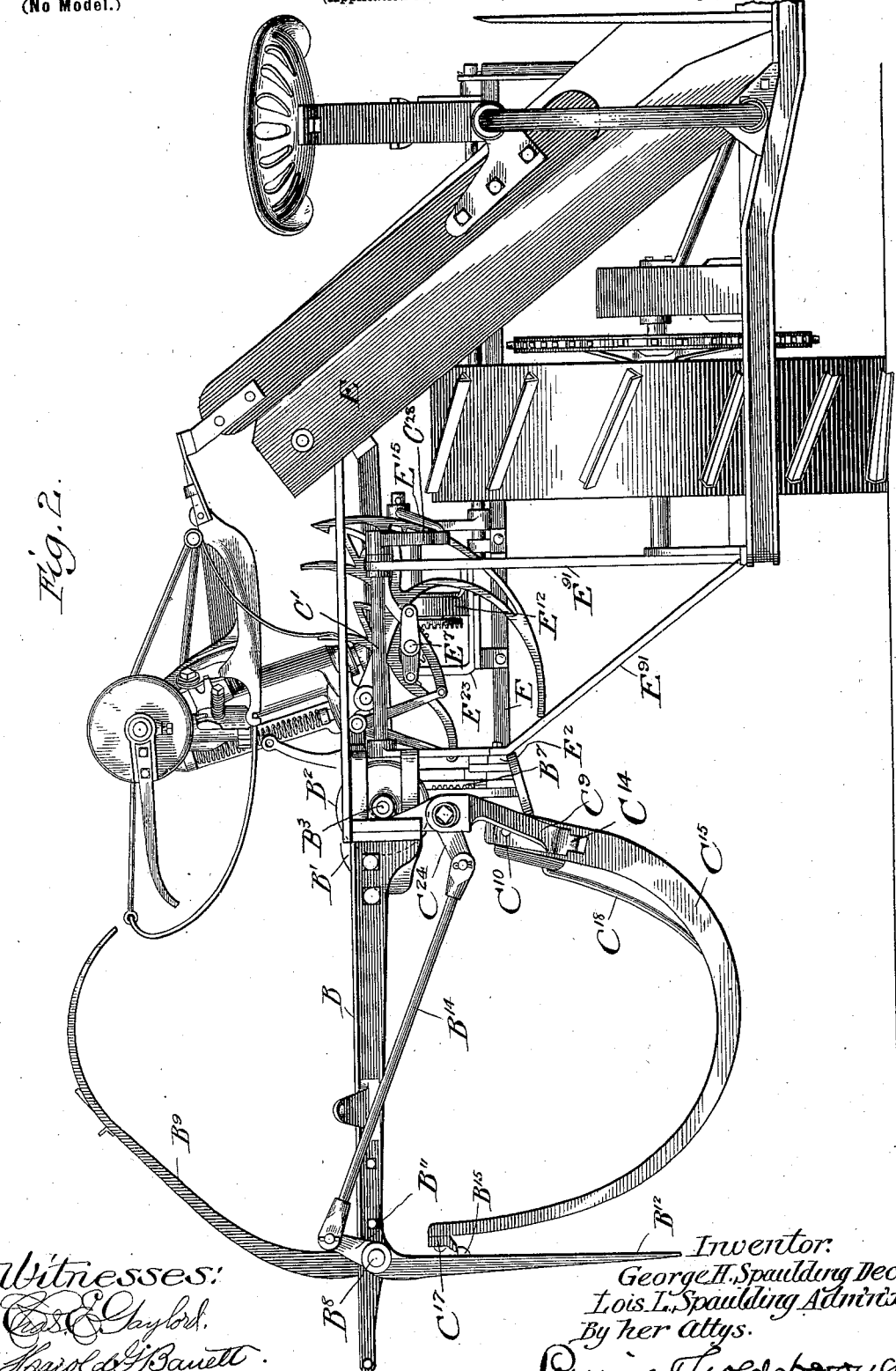

No. 698,230. Patented Apr. 22, 1902.
G. H. SPAULDING, Dec'd.
L. L. SPAULDING, Administratrix.
GRAIN SHOCKING ATTACHMENT FOR HARVESTING MACHINES.
(Application filed Feb. 27, 1901.)
(No Model.) 8 Sheets—Sheet 3.
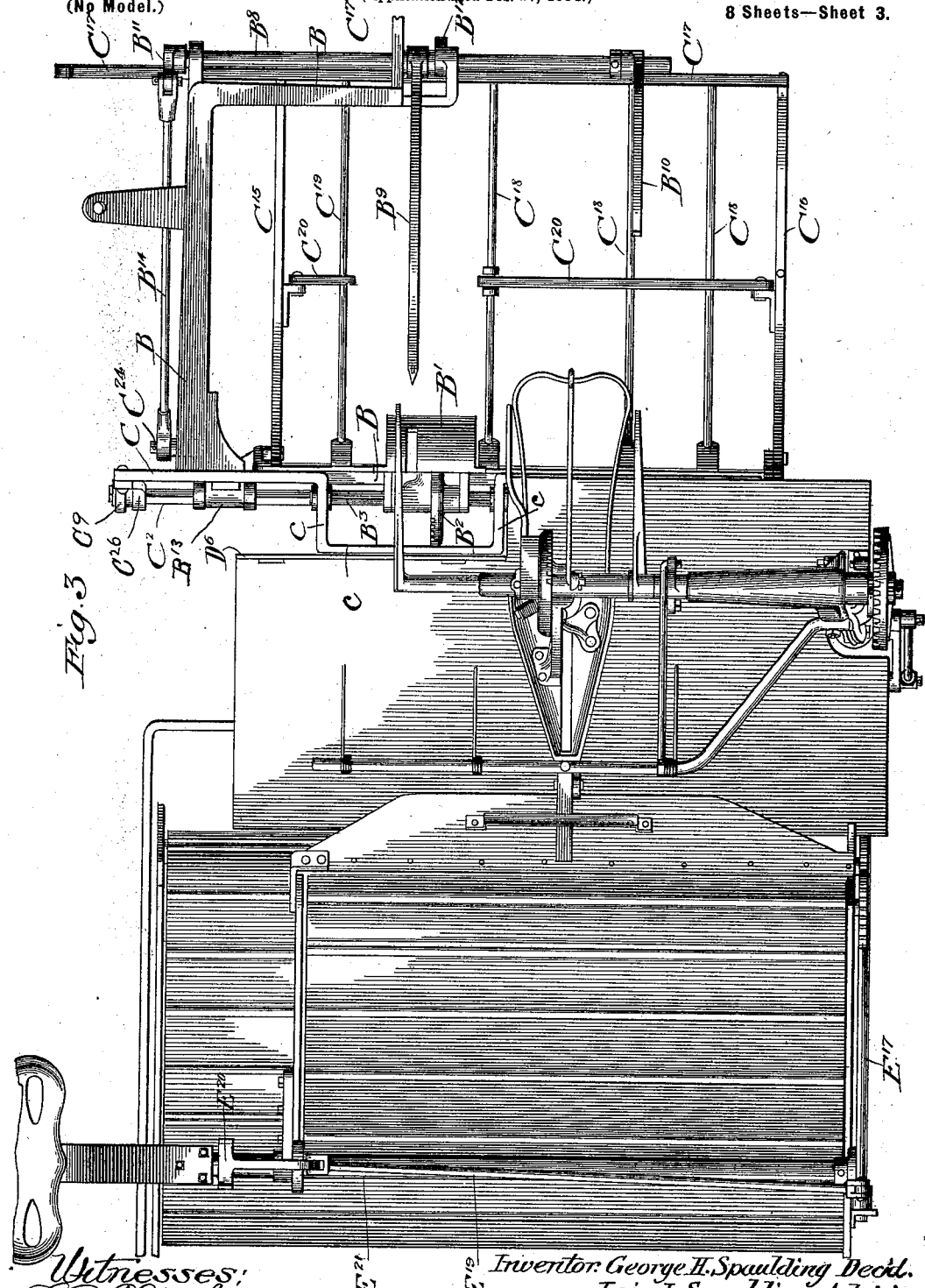

No. 698,230. Patented Apr. 22, 1902.
G. H. SPAULDING, Dec'd.
L. L. SPAULDING, Administratrix.
GRAIN SHOCKING ATTACHMENT FOR HARVESTING MACHINES.
(Application filed Feb. 27, 1901.)
(No Model.) 8 Sheets—Sheet 4.
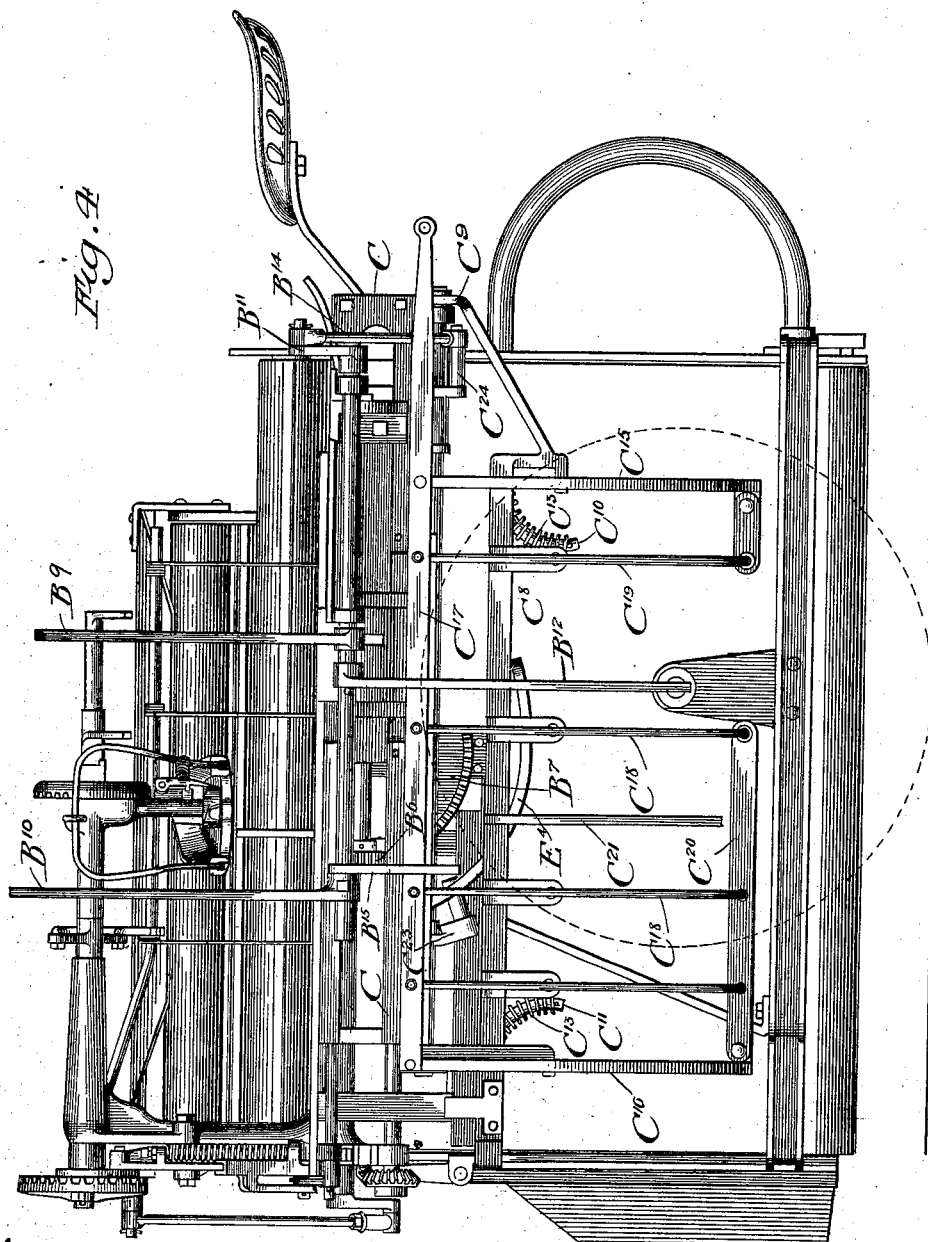

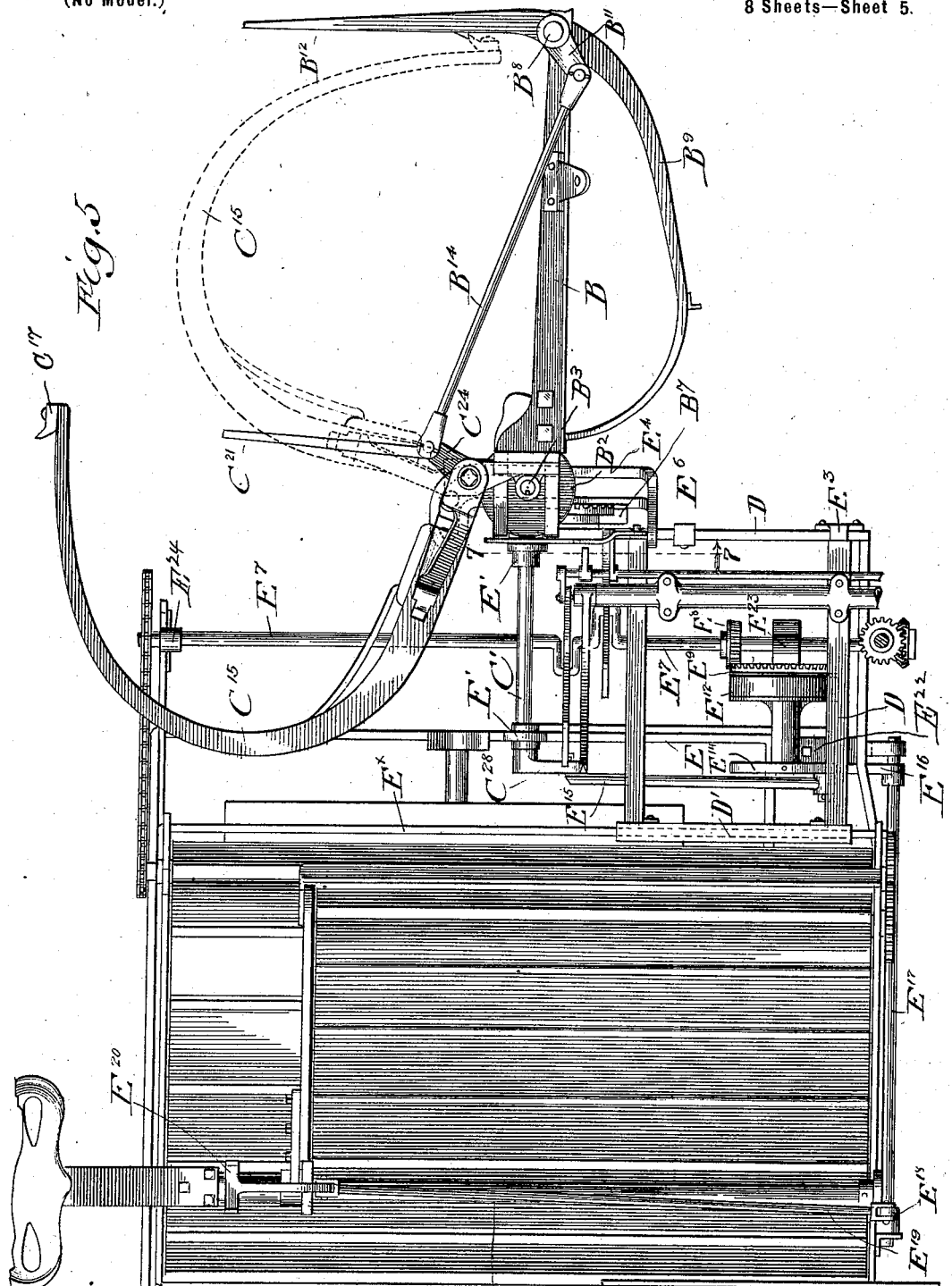

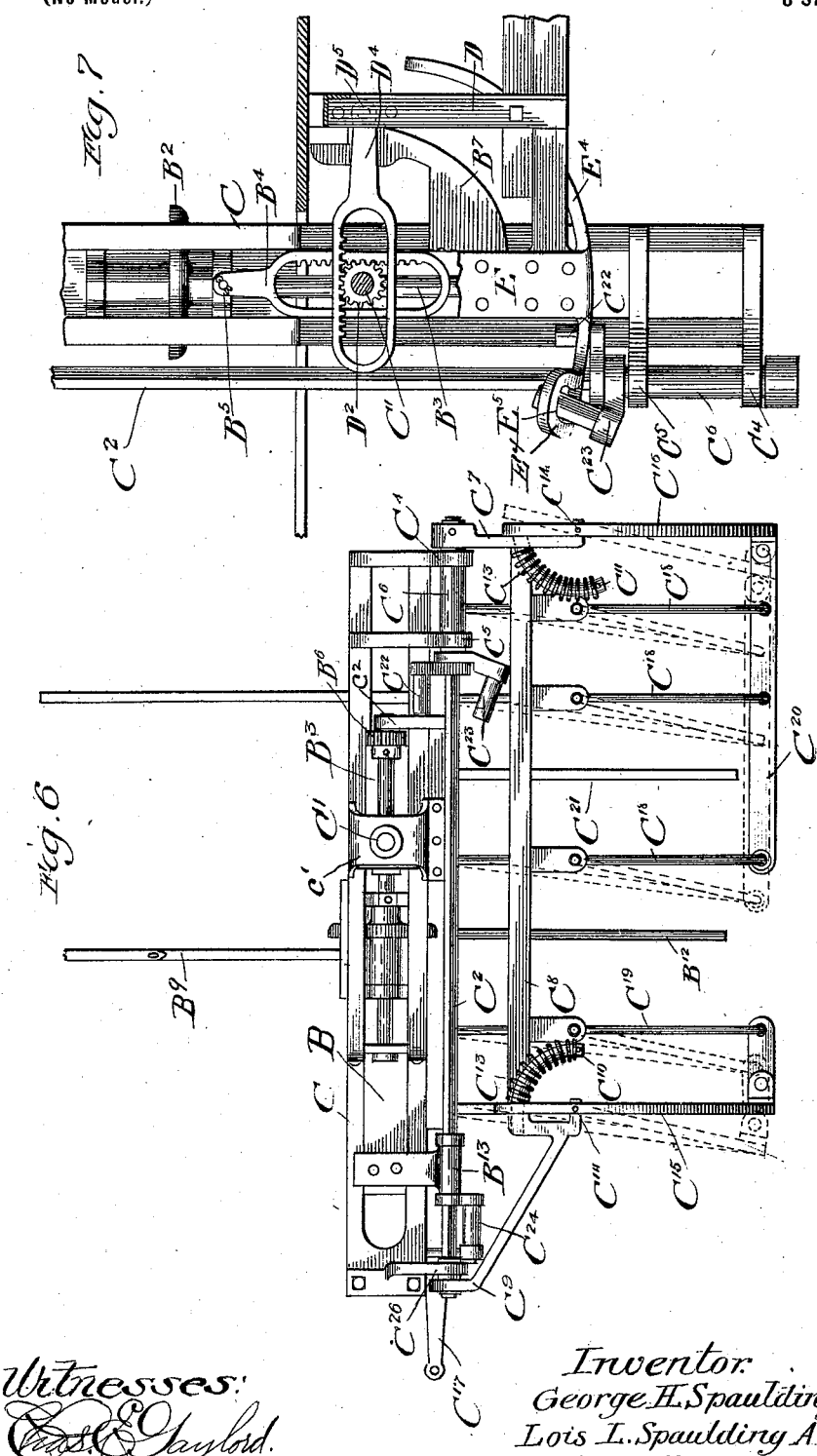

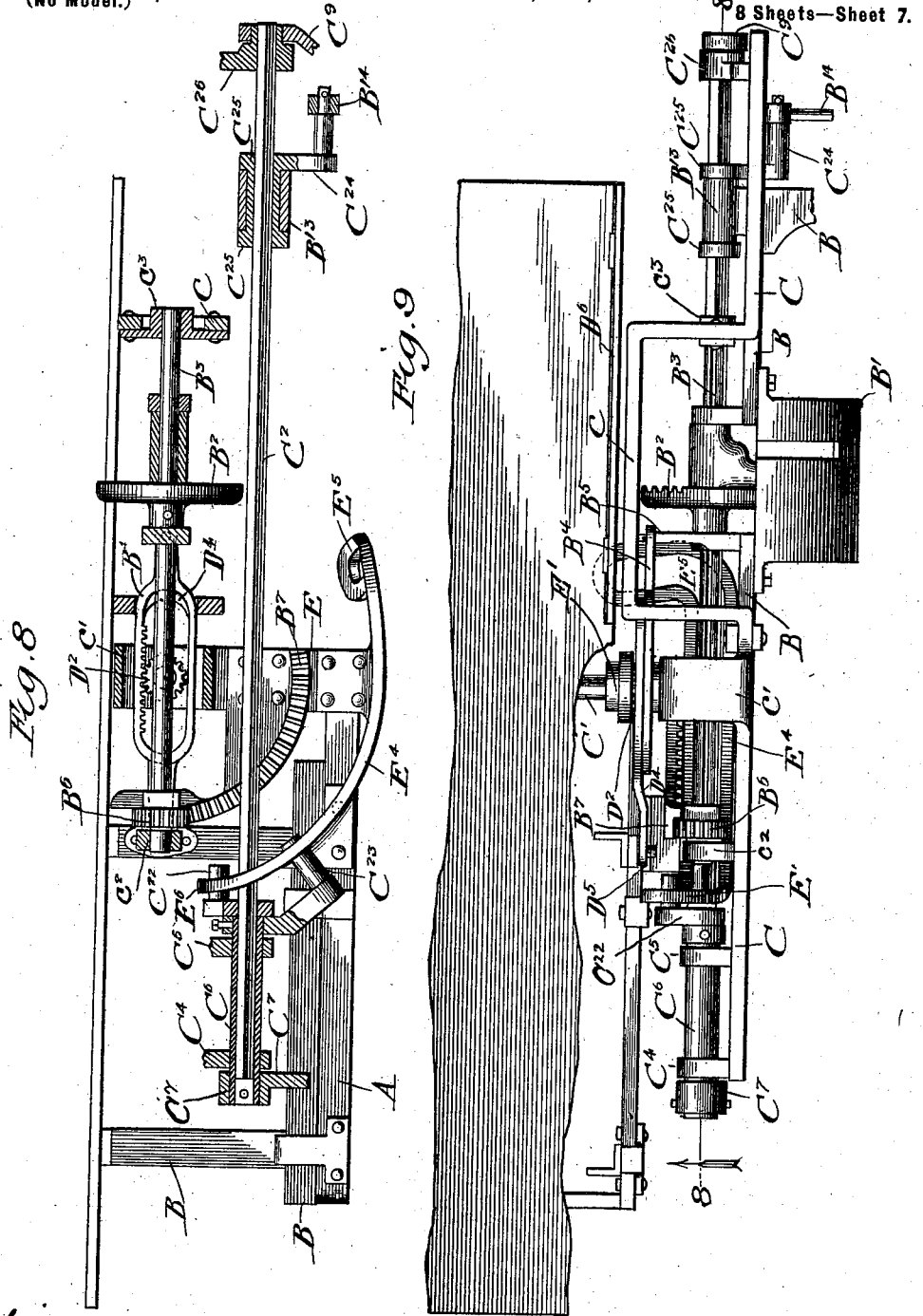

No. 698,230. Patented Apr. 22, 1902.
G. H. SPAULDING, Dec'd.
L. L. SPAULDING, Administratrix.
GRAIN SHOCKING ATTACHMENT FOR HARVESTING MACHINES.
(Application filed Feb. 27, 1901.)
(No Model.)
8 Sheets—Sheet 8.
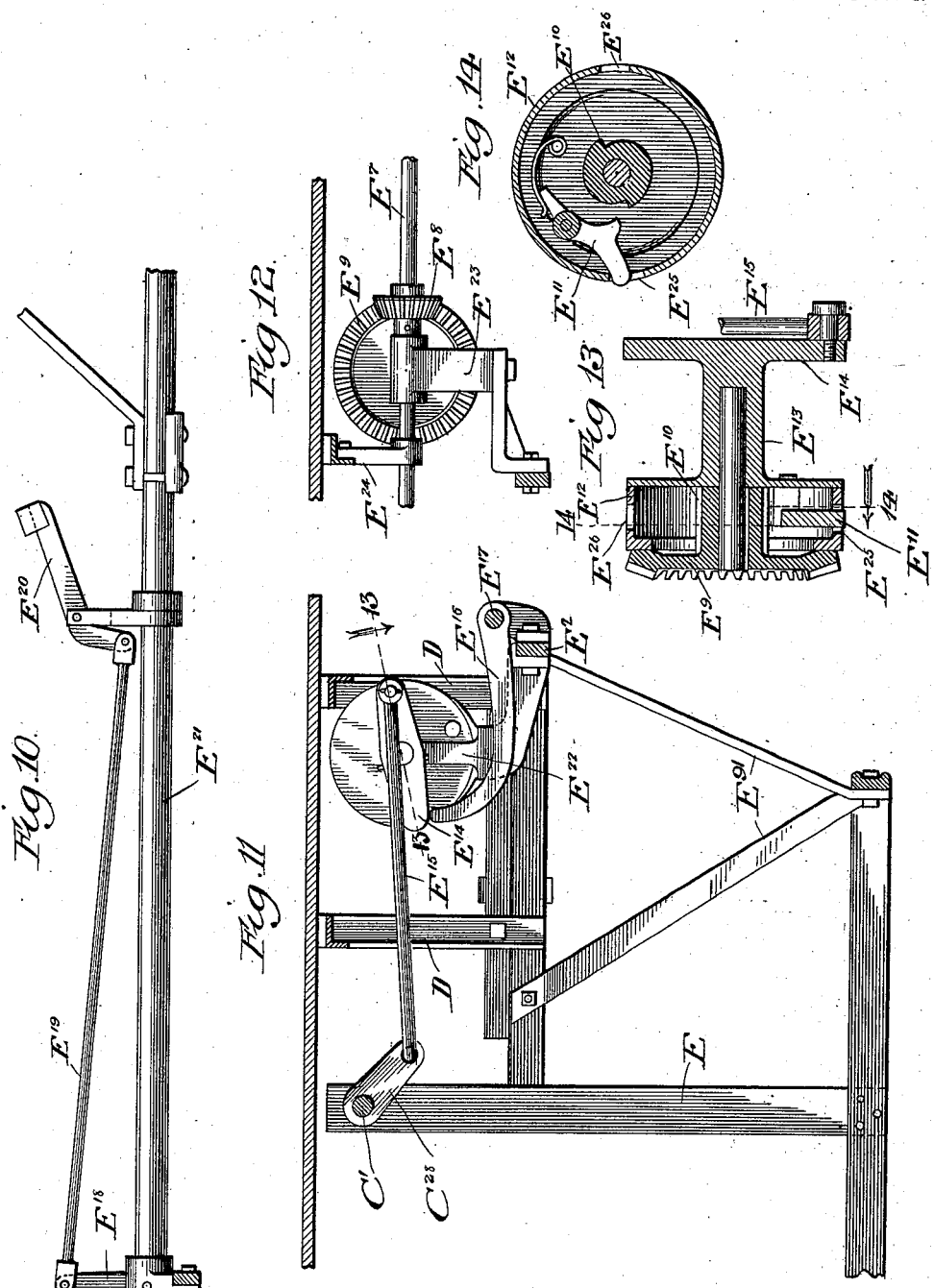
Witnesses:
Inventor:
George H. Spaulding Dec'd.
Lois L. Spaulding Admrix.
By her attys.

UNITED STATES PATENT OFFICE.

LOIS L. SPAULDING, OF CHICAGO, ILLINOIS, ADMINISTRATRIX OF GEORGE H. SPAULDING, DECEASED, ASSIGNOR TO McCORMICK HARVESTING MACHINE COMPANY, OF CHICAGO, ILLINOIS.

GRAIN-SHOCKING ATTACHMENT FOR HARVESTING-MACHINES.

SPECIFICATION forming part of Letters Patent No. 698,230, dated April 22, 1902.

Application filed February 27, 1901. Serial No. 49,035. (No model.)

*To all whom it may concern:*

Be it known that I, LOIS L. SPAULDING, a citizen of the United States, residing at Chicago, county of Cook, and State of Illinois, widow of GEORGE H. SPAULDING, deceased, late a citizen of the United States, and a resident of Chicago, Cook county, Illinois, am the administratrix of the estate of said GEORGE H. SPAULDING, and that during his lifetime said GEORGE H. SPAULDING invented certain new and useful Improvements in Grain-Shocking Attachments for Harvesting-Machines; and I do hereby declare the following to be a full, clear, and exact description of the same, such as will enable others skilled in the art to which it appertains to make and use the same.

Self-binding harvesters have for a long time been provided with bundle carriers and droppers to receive the bound sheaves from the binder and carry them until a sufficient number has accumulated to form a shock, when they were dumped or allowed to roll off in haphazard position, to be afterward collected and set up in the form of a shock.

Recently it has been proposed to attach to the binder a shocker in contradistinction to a carrier and dropper, this shocker being adapted to receive the bound bundles from the binder, as before, and to confine them in the form of a shock until a sufficient number has accumulated, when the shocker is tilted or turned over so as to deposit the shock on the ground with the bundles setting up on end, thereby doing away with the labor of subsequently shocking the bundles.

The present invention has for its object to provide an improved shocking attachment for this general purpose; and with this object in view it consists in the construction and arrangement hereinafter illustrated and described.

Referring to the drawings, Figure 1 is a front elevation of the shocker and so much of the harvesting-machine as is necessary to show the relation of the shocker thereto, the parts being in position to receive the bundles from the binder. Fig. 2 is a rear elevation of the same parts. Fig. 3 is a plan of the same. Fig. 4 is a side elevation of the machine. Fig. 5 is a plan, with the binder-deck and upper portions of the binder removed, showing the shocker in its discharging position. Fig. 6 is a side elevation of the shocking-cradle removed from the harvester. Fig. 7 is a detail section on the line 7 7 of Fig. 5 of a portion of the harvester-frame, showing the supporting-frame of the shocker swung to its vertical or discharging position and illustrating mechanism for adjusting the shock-binder simultaneously with the sheaf-binder. Fig. 8 is a vertical section on the line 8 8 of Fig. 9 looking in the direction of the arrow. Fig. 9 is a plan of the shocker-supporting frame and its accompanying mechanism, showing also the manner of supporting it from the harvester. Fig. 10 is a side view of the seat-supporting bar, showing a foot-lever and its connections with the tripping device which operates the clutch for swinging the shocker. Fig. 11 is a detail view of the connections between the clutch-gearing and the shaft which rocks the shocker. Figs. 12, 13, and 14 are detail views illustrating the construction of the gearing and clutch mechanism, Fig. 14 being a section on line 14 14 of Fig. 13, and Fig. 13 being a section on line 13 13 of Fig. 11.

Similar letters of reference refer to the same parts in the several views.

The shocking device consists substantially of the following parts—to wit, a main supporting-frame located when in its bundle-receiving position parallel with and just underneath the outer edge of the binder-deck, a lower or bundle-receiving cradle hinged to the supporting-frame, a U-shaped shock-binder frame, one arm of which, carrying the knotter, slides in guides on the supporting-frame with the closed end of said U-frame toward the rear of the harvester, a shaft pivoted in the outer arm of the U-frame and provided with arms for compressing and holding the shock, one of which may serve as the needle-arm in case a binding device is to be used, and, lastly, such shafting and gearing as are necessary to give proper movements to these parts.

The main supporting-frame C of the shocker (shown best in Figs. 6 and 9) consists of upper and lower bars set vertically edgewise one over the other, with a narrow intervening space between them. These bars are joined and braced by brackets at the ends, and the space between them serves as a guideway for one arm of the sliding U-shaped frame B B B of the shocker, on which is carried the breast-plate B' and other parts of the knotting mechanism of the shocker. The frame C is bent laterally about midway of its ends at $c$ to accommodate the knotting devices. An arch $c'$ also projects inwardly from the upper bar over the shafting carried by the frame C, and to the inner end of this arch is secured the shaft C', which is mounted in bearings E' E' on the harvester-frame, as clearly shown in Fig. 5. The shaft C' is the sole support of the frame C and serves to rock the same when the shocker is operated.

Mounted in suitable bearings $c^2$ $c^3$ on the back of the frame C is a shaft $B^3$, which drives by a groove and spline the knotter-operating wheel $B^2$ of the shocker, while allowing said wheel to slide thereon during the adjustment of the binder-frame B to accommodate long or short grain. This adjustment is made simultaneously with the adjustment of the sheaf-binder of the harvester by mechanism which will now be described. The frame of the harvester is provided with an upper rail $E^x$ at the head of the elevator-frame and a lower outer rail $E^2$. The binder slides, the rail $E^2$ being supported at the front of the machine by a cross-bar of the frame E and at the rear by the braces $E^{91}$ and the binder being held thereon by clips D' and $E^3$, respectively, the former of which is attached to the binder and the latter to the guide-rail $E^2$, all of which is most clearly shown in Figs. 1 and 5. Turning loosely on the shaft C', between the shocker-frame and the outer bearing E', is a spur-gear $D^3$, with which mesh two racks $D^4$ $B^4$, one of which, $D^4$, is connected with the frame of the sheaf-binder at $D^5$ and the other, $B^4$, with the frame of the shock-carrier at $B^5$. (See Figs. 7, 8, and 9.) It will thus be seen that whenever the sheaf-binder is adjusted forward and backward in the usual way the rack $D^4$ will rotate the spur-gear $D^2$, which will in turn drive the rack $B^4$, and thus adjust the shock-carrier in the same direction, whether the shocker-frame be in its horizontal or its vertical position. The knotter-shaft $B^3$ carries at one end a spur-gear $B^6$, which meshes with a segmental rack $B^7$, rigidly secured in vertical position to the harvester-frame E, so that as the shocker-frame C, carrying with it the knotter-shaft $B^3$, is tilted to discharge its load the gear $B^6$ will be rotated by reason of its engagement with the fixed rack, which is on an arc concentric with the shaft C', and through the shaft $B^3$ will drive the knotter-wheel $B^2$.

On the outer arm of the U-shaped frame B is mounted in suitable bearings a shaft $B^8$, to which are rigidly connected two arms $B^9$ $B^{10}$, extending normally upward and toward the binder-deck, and at the rear end of this shaft a crank $B^{11}$ is provided, by which the shaft is rocked. These arms, in connection with the cradle portion of the shocker, grasp the shock and assist in placing it on the ground, and the arm $B^9$ serves also as a needle-arm to carry the cord over the shock to the knotter, which it reaches through a slot in the breast-plate B'.

On the back of the frame C are two bearings $C^4$ and $C^5$, in which is mounted a tubular rock-shaft $C^6$, having secured at the inner end thereof a crank $C^{23}$. Extending wholly or partly through the tubular rock-shaft $C^6$ and turning freely therein is a shaft $C^2$, which is supported at the rear end in a bearing $C^{26}$, also formed on or secured to the inner or back side of the frame C. In the drawings the shaft $C^2$ is flattened on one side, and fitted upon it, so as to be rocked thereby, is a crank $C^{24}$, having a hub formed with two shoulders $C^{25}$, between which lies a sleeve-bearing $B^{13}$, forming part of the U-shaped frame of the sliding shock-carrier B, so that as the carrier is adjusted the crank $C^{24}$, which is connected by a pitman $B^{14}$ with the crank $B^{11}$ of the needle-shaft $B^8$, will follow the movements of the carrier B. Immediately adjacent to the crank $C^{23}$ at the opposite end of the shaft is a crank $C^{22}$, rigidly secured on the shaft $C^2$, and these cranks engage a cam-slot formed in a bracket $E^4$, fastened to the frame E of the harvester. This bracket $E^4$ is curved in the vertical plane of an arc struck from the shaft C', with which the frame C rocks, and the cam-slot has a straight portion and two opposite end portions $E^5$ and $E^6$, which curve laterally and horizontally inward relative to the straight portion. When the shocker stands in its horizontal or receiving position, the crank $C^{22}$ lies in the upper laterally-curved rear end $E^6$ of the slot while the crank $C^{23}$ is in the straight portion. As soon as the shocker-frame C is rocked the crank $C^{22}$ swings around into the straight portion of the slot, thereby rocking the shaft $C^2$, and by means of the pitman $B^{14}$ carrying the needle-arm $B^9$ with the cord down through the breastplate B' to the knotter. As the tilting of the shocker-frame proceeds the cranks $C^{22}$ and $C^{23}$ move in the straight portion of the cam-slot without affecting the rock-shafts $C^6$ and $C^2$, but on reaching the upright position the crank $C^{23}$ is forced into the curved portion $E^5$ at the opposite end of the cam-slot and rocks the said crank and its shaft $C^6$, but the crank $C^{22}$ does not enter this curve. Sleeved over the end of the tubular rock-shaft $C^6$ and secured thereto is an arm $C^7$, and at the opposite end of the shaft $C^2$ and sleeved on the bearing $C^{26}$ is a second arm $C^9$, the two being connected by a bar $C^8$, the whole forming a rigid frame rocking with the shaft $C^6$. The bar $C^8$ is offset stubbleward at its juncture with the arms $C^7$ and $C^9$. Pivoted to the lower ends of the arms $C^9$ and $C^7$ at the points $C^{14}$ are U-shaped bars $C^{15}$ and $C^{16}$, respectively, each of which extends above its pivot, the bar $C^{15}$ bearing against a coiled spring $C^{13}$, which is guided by a curved bar $C^{10}$, secured to the arm $C^9$. The spring bears at its opposite end against a transverse pin in the curved bar. The arrangement of the spring $C^{13}$ on the opposite arm $C^7$ is slightly different, the curved bar $C^{11}$ extending through an opening in the arm $C^7$ and being attached to the U-shaped bar $C^{16}$, while the spring $C^{13}$ bears against the pin at one end and against the arm $C^7$ at the other. The U-shaped bars $C^{15}$ and $C^{16}$ are connected together at their outer ends by a bar $C^{17}$. Smaller U-shaped rods $C^{18}$ and $C^{19}$ are also pivoted to the bars $C^8$ and $C^{17}$, those lettered $C^{18}$ passing at the lowest point of their curve through eyes in a link $C^{20}$, which is in turn pivoted to the U-shaped bar $C^{16}$. The bar $C^{19}$ is linked in the same way to the bar $C^{15}$, so that each set may independently yield rearwardly upon striking any obstruction. The reason for dividing the U-shaped bars into two sets will be presently explained. The U-shaped bars form a cradle to receive the bundles as they are ejected from the binder, and being carried by the shaft $C^6$ and the frame C the cradle will tilt forwardly with the frame C when the latter is moved by the rotation of the shaft $C'$ and will be swung backwardly and inwardly toward the binder-deck out of the path of the shock when the shaft $C^6$ is rocked. As the rear end of the cradle swings upwardly with the frame C and then inwardly with the movement of the shaft $C^6$ the curved bars $C^{15}$ and $C^{19}$ pass above the edge of the binder-deck and the bars $C^{16}$ and $C^{18}$ below the same, the reason for dividing these arms into two sets being that if the link $C^{20}$ were continuous it would strike the rear edge of the deck and prevent this movement. To allow the rear part of the frame C to swing upward and also to permit the outer edge of the binder-deck to project over and protect the operating-gearing on the back of the frame C without interfering with the upward swing of the same, a section $D^6$ of the rear outer edge of the binder-deck is hinged to turn upwardly out of the way of said frame as the latter rises.

A dependent arm $B^{12}$ is rigidly secured to the outer arm of the U-shaped frame B and a similar one $C^{21}$ to the main shocker-frame C, and these arms guide and support the shock as the machine moves forward away from it after depositing it upon the ground.

The needle-arm shaft $B^8$ of the shock-carrier has keyed to it a hook or latch $B^{15}$, which engages and assists in supporting the bar $C^{17}$ of the shocker-cradle while the latter is receiving the bundles.

Having now described the construction of the shocker, there remains only the gearing for rocking it through the shaft $C'$ and the means whereby it is controlled at the will of the operator.

On the inner end of the shaft $C'$ is a crank $C^{28}$, connected by a pitman $E^{15}$ with a crank on a cross-head $E^{14}$, whose shaft or hub $E^{13}$ is mounted in a bearing $E^{22}$ on the harvester-frame, this construction being best shown in Figs. 5, 11, and 13. In suitable bearings $E^{23}$ and $E^{24}$ on the harvester-frame is mounted the constantly-running packer-shaft $E^7$ of the main or sheaf binder D, which carries a bevel-pinion $E^3$, meshing with a similar larger gear $E^9$, carried on a stud-shaft which is sleeved in the counterbored hub $E^{13}$. On the hub of the gear $E^9$ are formed ratchet-teeth $E^{10}$, and on the face-plate of the hub or shaft $E^{13}$ is pivoted a pawl $E^{11}$, normally held out of contact with the ratchet-teeth $E^{10}$ by a suitable spring. Between the gear $E^9$ and the face-plate of the hub $E^{13}$ and surrounding the clutch is a cylindrical shell $E^{12}$, secured to a part of the bearing-bracket $E^{23}$, having at diametrically opposite points in its periphery slots $E^{25}$ and $E^{26}$, through which the tail of the dog $E^{11}$ may protrude when the dog is disengaged.

On the front of the elevator-frame of the harvester is mounted a rock-shaft $E^{17}$, operated through a crank $E^{18}$ and pitman $E^{19}$ by a bell-crank lever $E^{20}$, pivoted on the seat-bar $E^{21}$ within reach of the foot of the operator, and on the end of the shaft $E^{17}$, directly opposite the cross-head $E^{14}$, is an arm $E^{16}$, which will engage said cross-head when the shaft $E^{17}$ is rocked and will force the shaft $E^{13}$ forward in its proper direction of rotation.

The operation of the shocker, the construction of which has now been fully described, is as follows: The shocker being in its horizontal or receiving position, with the needle-arm raised to allow the bundles to pass beneath it into the cradle until a sufficient number has been accumulated, the operator presses with his foot upon the lever $E^{20}$ and through the link $E^{19}$, crank $E^{18}$, and shaft $E^{17}$ forces the arm $E^{16}$ against the cross-head $E^{14}$, which gives the shaft $E^{13}$ a partial rotation, thereby carrying the tail of the dog $E^{11}$ under the fixed shell $E^{12}$ and causing said dog to engage the ratchet-teeth on the hub of the gear $E^9$, which is constantly driven by the packer-shaft $E^7$ of the main or sheaf binder. As the clutch is thus thrown into connection the shaft $E^{13}$ is carried through a half-revolution, but is stopped by the spring throwing the tail of the dog $E^{11}$ out through the slot $E^{26}$ when the dog gets around to it, and thus disengaging the clutch. During this half-revolution the pitman $E^{15}$ through the crank $C^{28}$ rocks the shaft $C'$, and with it the main shocker-frame C. At the first movement of this frame the crank $C^{22}$ swings out from the laterally-curved portion $E^6$ of the rear end of the cam-slot into the straight portion, and thus rocks the shaft $C^2$ and by means of the crank $C^{24}$, pitman $B^{14}$, and needle-shaft $B^8$ drives down the needle-arm $B^9$ and carries the cord through the breast-plate $B'$ to the knotter, and at the same time the latch $B^{15}$ releases the bar $C^{17}$. As the movement of the frame C continues the cranks $C^{22}$ and $C^{23}$ travel in the straight portion of the cam-slot and are not further operated, but the spur-gear $B^6$, being carried by the frame and meshing with the fixed rack $B^7$, rotates the knotter-shaft $B^3$ and knotter-wheel $B^2$, and thus ties the knot during the downward swing of the shocker. As the crank $C^{23}$ reaches the forward end of the cam-slot and the shocker nears its vertical position the curved portion $E^5$ of the slot acts upon it and rocks the shaft $C^6$, to which the shocking-cradle is connected through the arm $C^7$, swinging the cradle toward the rear of the machine and inwardly across the binder-deck, as already described, thus removing it from the path of the shock, which is now standing upon the ground between the arms $B^{12}$ and $C^{21}$, which support and guide it as the harvester moves on. This action of the shocker takes place while grain is accumulating in the binder to form a bundle, and before this is accomplished the operator by placing his foot a second time on the lever $E^{20}$ again trips the clutch, causing the shaft $E^{13}$ to make another half-revolution and rock the shaft $C'$ in the opposite direction, thus reversing the cycle of operations, swinging the cradle away from the binder-deck, rocking the shocker-frame to vertical position, restoring the knotter mechanism, withdrawing the needle, and causing the latch $B^{15}$ to lock the bar $C^{17}$ of the cradle, the parts being then in position for receiving another shock.

Having thus described the invention, what is claimed is—

1. A shocking attachment for self-binding harvesters having, in combination, a main frame, a shaft secured near the center thereof and at a right angle thereto for pivotally supporting the shocker on the harvester-frame, a bundle-receiving cradle hinged to swing transversely to the movement of the shocker; a frame projecting transversely from the main frame across the cradle, a rock-shaft, mounted on the outer side of said frame parallel with the main supporting-frame, and carrying compressing and holding arms, means for rocking said shaft and arms, means for swinging the cradle on its hinges so as to deposit the shock on the ground, and means for rocking the cradle horizontally out of the way of the shock.

2. A shocking attachment for self-binding harvesters having, in combination, a main frame, a shaft secured near the center thereof and at a right angle thereto for pivotally supporting the shocker on the harvester-frame, a bundle-receiving cradle hinged so as to swing transversely to the movement of the shocker, knotting devices mounted on the main frame, a frame projecting transversely from the main frame across the cradle, a rock-shaft mounted in the outer side of said frame, parallel with the main supporting-frame and carrying a needle-arm for passing the binding-cord to the knotter, means for rocking the needle-shaft, means for swinging the cradle on its hinges so as to deposit the shock on the ground, and means for rocking the cradle horizontally out of the way of the shock.

3. In combination with a self-binding harvester, a shocking-cradle lying parallel with and beneath the binder-deck, when in its receiving position, said cradle being pivoted so as to tilt forwardly and downwardly to a substantially vertical position to deposit the shock, and being also pivoted to swing rearwardly and inwardly toward the side of the harvester out of the way of the shock as the machine advances.

4. In combination with a self-binding harvester, a shocking-cradle pivoted to tilt in a vertical plane parallel with the outer edge of the binder-table, and swing rearwardly and toward the binder-deck, the bundle-receiving portion of the cradle being divided transversely so that the rear portion will pass above the binder-deck and the front portion below the same.

5. A shocking attachment for self-binding harvesters comprising, in combination, a main frame, a shaft secured near the center thereof and at a right angle thereto for pivotally supporting the shocker on the harvester-frame, a bundle-supporting cradle hinged to swing in a plane transverse to the main frame, a frame projecting transversely from the main frame across the cradle, an arm depending from said frame, and a similar arm depending from the main frame to support and guide the shock when the shocker is tilted to its discharging position.

6. A shocking attachment for self-binding harvesters having, in combination, a main frame, a shaft secured near the center thereof and at a right angle thereto for pivotally supporting the shocker on the harvester-frame, a bundle-receiving cradle hinged to swing transversely to the movement of the shocker, a frame projecting from the main frame across the cradle, a shaft mounted on the outer side of said frame, parallel to the main frame, a hook or latch secured to said shaft and adapted to engage the outer edge of the shocking-cradle, means for rocking the shaft and hook, means for swinging the cradle, and means for tilting the main frame.

7. A shocker-cradle consisting of two side bars, two bow-shaped end bars pivoted at a distance from each other to said side bars, intermediate bow-shaped rods also pivoted to the side bars, links connecting the rods to the end bars, and springs resisting the swinging of the bow-shaped bars and rods on their pivots.

8. A shocker-cradle consisting of two side bars, two bow-shaped end bars pivoted at a distance from each other to said side bars, a curved rod secured to one end bar and extending through an opening in one of the side bars, a coil-spring mounted on the curved rod and bearing at one end on an abutment of the curved rod and at the other on said side bar, a similar curved rod mounted on the other side bar and passing through an opening in the other bow-shaped end bar, a coil-spring on said rod bearing at one end against the end bar and at the other against an abutment on the curved rod, and a series of bow-shaped rods pivoted at their ends in the two side bars of the cradle and linked to the end bars.

9. In combination with a harvester having an adjustable binder, a tilting shocker, an adjustable shock-binder on said shocker, and means for adjusting the binders simultaneously in any position of the shocker.

10. The combination with a harvester having an adjustable binder, a tilting shocker, an adjustable shock-binder on said shocker, a loosely-rotating gear concentric with the shocker-pivot, and two rack-bars meshing with and free to swing about said gear, one of said bars being connected with the harvester-binder, and the other with the shock-binder.

11. In a shocker for self-binding harvesters, a main frame swinging about a pivot on the harvester and carrying the bundle-receiving cradle, a shock-binder mounted on said main frame, a segmental rack secured to the harvester-frame concentric with the pivot of the shocker, and a knotter driving-shaft mounted in bearings on the main shocker-frame and having a gear which meshes with the segmental rack.

12. In a shocker for self-binding harvesters, a main frame swinging about a pivot on the harvester and carrying the bundle-receiving cradle, a shock-binder frame mounted on said main frame, a needle-shaft on the outer side of the binder-frame, a crank-shaft in bearings on the main shocker-frame, a curved bracket on the harvester-frame concentric with the shocker-pivot and provided with a cam-slot having a straight portion and a curved end portion, said cam-slot engaging a crank on the crank-shaft, and means connecting the crank-shaft with the needle-shaft.

13. In a shocker for self-binding harvesters, a main frame swinging about a pivot on the harvester, a bundle-receiving cradle hinged to said main frame, a curved bracket on the harvester-frame concentric with the pivot of the shocker and provided with a cam-slot formed with a straight portion and a curved end portion, a rock-shaft mounted in bearings on the main shocker-frame and carrying a crank which engages the cam-slot, and connections between the rock-shaft and the bundle-receiving cradle for swinging the same.

14. In a shocker for self-binding harvesters, a main frame swinging about a pivot on the harvester, a shock-binder thereon, a bundle-receiving cradle hinged to said main frame, a curved bracket on the harvester-frame, concentric with the pivot of the shocker and provided with a cam-slot formed with a straight portion and a curved portion at each end, a tubular rock-shaft mounted in bearings on the main shocker-frame and carrying a crank which travels in the straight portion and one of the curved end portions, connections between the tubular crank-shaft and the shocker-cradle, a second crank-shaft carried at one end in the tubular crank-shaft and at the other in a bearing on the main shocker-frame, a crank on said shaft traveling in the straight portion and the second curved portion of the cam-slot, and connections between the second crank-shaft and the needle-shaft of the shock-binder.

15. In a shocker for self-binding harvesters, a main frame swinging about a pivot on the harvester, a U-shaped shock-binder frame having one arm sliding on the shocker-frame, a knotting mechanism carried on said arm, a knotter-shaft mounted on the shocker-frame having a gear at one end and a groove-and-spline connection with the knotter-wheel, a segmental rack on the harvester-frame engaging the gear on the knotter-shaft, a tubular crank-shaft mounted on the shocker-frame, a second crank-shaft having one end sleeved within the tubular shaft and the other in a bearing on the shocker-frame, a crank connected for rotation to said shaft but sliding longitudinally thereon, the hub of said crank being held by a bearing-sleeve on the sliding binder-frame, a needle-shaft on the outer arm of the sliding binder-frame, a pitman connecting the crank on the last-mentioned crank-shaft with a crank on the needle-shaft, a curved bracket on the harvester-frame, concentric with the pivot of the shocker and provided with a cam-slot formed with a straight portion and two curved end portions, cranks on the tubular shaft and the second crank-shaft which travel in the cam-slot, a bundle-receiving cradle hinged to the main shocker-frame, and connections between the tubular crank-shaft and the cradle for swinging the same.

16. A shock-binder having a main frame, carrying the necessary shafts and gearing for operating the shock-binder and other parts, and swinging in a plane parallel with the outer edge of the binder-table, in combination with a harvester binder-table projecting over the shocker-frame to protect the gearing thereon, and having at its rear outer edge a hinged portion which turns up out of the way as the rear end of the shocker-frame rises.

In testimony whereof I hereunto affix my signature in the presence of two witnesses.

LOIS L. SPAULDING,
*Administratrix of the estate of George H. Spaulding, deceased.*

Witnesses:
JOHN C. PENNIE,
J. A. GOLDSBOROUGH.